March 19, 1968 J. S. ENGEL 3,374,435

REDUCTION OF THE EFFECT OF IMPULSE NOISE BURSTS

Filed July 29, 1965 2 Sheets-Sheet 1

INVENTOR
J. S. ENGEL
BY
J. P. Kearns
ATTORNEY

March 19, 1968 J. S. ENGEL 3,374,435

REDUCTION OF THE EFFECT OF IMPULSE NOISE BURSTS

Filed July 29, 1965 2 Sheets-Sheet 2

3,374,435

REDUCTION OF THE EFFECT OF IMPULSE NOISE BURSTS

Joel S. Engel, Bethesda, Md., assignor to Bell Telephone Laboratories, Incorporated, New York, N.Y., a corporation of New York Filed July 29, 1965, Ser. No. 475,703
11 Claims. (Cl. 325—324)

This invention relates to the reduction of interference in electrical communication transmission channels for digital data signals and, in particular, to the reduction of the effects of impulse noise in such channels.

A serious problem encountered in the transmission of digital data signals over facilities originally designed for voice communication is that occasioned by the occurrence of impulse noise. Impulse noise is that type of randomly occurring noise burst generally arising in telephone network automatic switching offices. Such noise differs from white noise, which maintains a reasonably steady average energy level, in that each impulse is characterized by relatively short duration, but high amplitude. These energy bursts have in most cases sufficient power either to obliterate valid data signal bits or to generate false data signal bits. In the case of high-speed data signaling impulse noise bursts are capable of destroying data bits in groups.

Because of the integrating effect of the human ear impulse noise has never been more than a nuisance factor in voice communication impairment. However, for digital data communication over voice circuits the resultant impairment caused by impulse noise places objectionable restraints on the realization of the full potential of voice circuits for data communication.

Previous attacks on the impulse noise problem have included energy spreading arrangements utilizing complementary delay filters as disclosed in United States Patent No. 3,032,725 issued May 1, 1962, to J. Knox-Seith, or burst-correcting error codes such as disclosed by D. W. Hagelbarger in United States Patent No. 2,956,124 issued Oct. 11, 1960.

It is a primary object of this invention to reduce the effect of impulse noise in switched digital data transmission systems.

It is another object of this invention to recognize the occurrence of an individual impulse noise burst in time to counteract its effect on received data signals.

It is a further object of this invention to estimate the characterizing parameters of an impending impulse noise burst in time to generate a counterburst, and offset the original burst with the counterburst.

It is a still further object of this invention to reduce the error rate in digital data transmission systems due to the presence of impulse noise without reducing the speed of transmission or increasing the bandwidth of the transmission medium.

According to this invention the onset of an impulse noise burst at the receiver of a digital data transmission system is detected, the initial noise component is isolated from the total received signal, the parameters of the total noise burst are estimated from the initial component, a replica noise burst of extended duration is generated and the replica noise burst is subtracted from the total received signal prior to data demodulation. The resultant signal presented to the demodulator or data sink is essentially noise free.

In one embodiment of a noise burst detector, parameter estimator and generator the initially separated input noise is applied to a phase-locked oscillator loop to reproduce the noise carrier frequency in correct frequency and phase. With the aid of this carrier the input noise is synchronously detected. In the absence of an impulse noise burst, the output of the detector is low-level white Gaussian noise. On the occurrence of the buildup of an impulse noise burst, the envelope thereof appears at the detector output. When the envelope is large enough to be distinguished from the Gaussian noise, but not yet large enough to cause errors in the message data, it is recognized by the threshold detector, which then triggers a simulated impulse noise generator. Actual and simulated noise envelopes are compared transition by transition in complementary squaring circuits to obtain a timing error signal. The latter signal, when gated to a variable delay circuit through which passes the output of the simulated envelope generator, reduces the timing error between actual and estimated envelopes to near zero. A further difference error signal obtained by subtracting the estimated from the actual noise envelopes controls the adjustment of a variable gain circuit also in tandem with the output of the simulated envelope generator. The simulated envelope, now adjusted in phase and amplitude to conform to the actual noise envelope, continues its buildup at a predetermined rate according to the characteristics of known noise bursts and is modulated onto the estimated carrier wave from the phase-locked oscillator loop to form the estimated noise burst. This accurate noise burst replica is thus available for cancellation of the actual noise burst from the received signal.

In another embodiment of a less complex simulated noise burst generator satisfactory for all but the most exacting requirements, the separated input noise is applied to a conventional envelope detector rather than a phase-locked oscillator. The step of accurately estimating the noise carrier is omitted. The amplitude of the simulated noise burst is estimated by integrating over alternate half cycles of envelope under the control of a threshold detector and gating circuit. The input noise signal is squared and differentiated to obtain a train of pulses corresponding to the zero crossings of the actual noise burst carrier wave. One of these timing pulses, corresponding to a zero crossing of the noise burst envelope, allows a signal of the correct value from the integrator to key a ringing network, whose output then becomes the estimated noise burst. The ringing network has a built-in response equal to the peak and decaying remainder of a typical noise burst. The simplified noise burst generator is obviously more economical of equipment than the prior embodiment.

An important feature of this invention is the arrangement for separating the initial input noise component from the total received signal by using a data signal generator at the receiver which matches that at the transmitter.

Another feature of this invention is the provision of apparatus for separately estimating from an initial sample the phase, amplitude and time of occurrence of the full impulse noise burst.

A further feature of this invention is the provision of apparatus for generating an accurate counterburst replica and subtracting this replica from the true impulse noise burst.

The invention, both as to organization and method of operation, together with further advantages, features and objects may best be understood by reference to the following description taken in connection with the accompanying drawing in which.

A digital transmission system operates by sending one of two possible signal states for each bit of data. Upon receipt of one of these signals, the receiver makes the decision as to whether the particular bit is a mark or a space. Once the decision is made the entire message up to that point is known in the absence of errors.

On a narrow-band channel, such as one of voice-band four-kilocycle width, each impulse noise burst has a total width of many signal bits. The envelope begins at a low level, builds up at an accelerating rate to a peak value, and then decays into the steady background white noise. At the leading and trailing edges, the noise is too low to cause errors. Only in the middle region, one or more bits in length, is the impulse damaging. As the burst is building up and is not yet large enough to cause errors, the transmitted signal is detected by the receiver with a high degree of assurance. During this short period at the beginning of the burst, the receiver can subtract its estimate of the transmitted signal from the combined signal and noise as received and thereby obtain an estimate of the noise burst. From this residue the receiver can estimate the three random parameters of amplitude, phase and time of occurrence characterizing the noise impulse beginning to build up. These parameters must be estimated before the arrival of the middle region of the burst which is large enough to cause errors. However, in accordance with this invention a replica of the expected noise burst can be generated at the receiver from these parameters knowing the envelope of the typical impulse noise burst. The replica burst is then subtracted from the received signal largely to cancel out the true impulse noise burst and maintain message reception substantially error-free.

Figure 1:
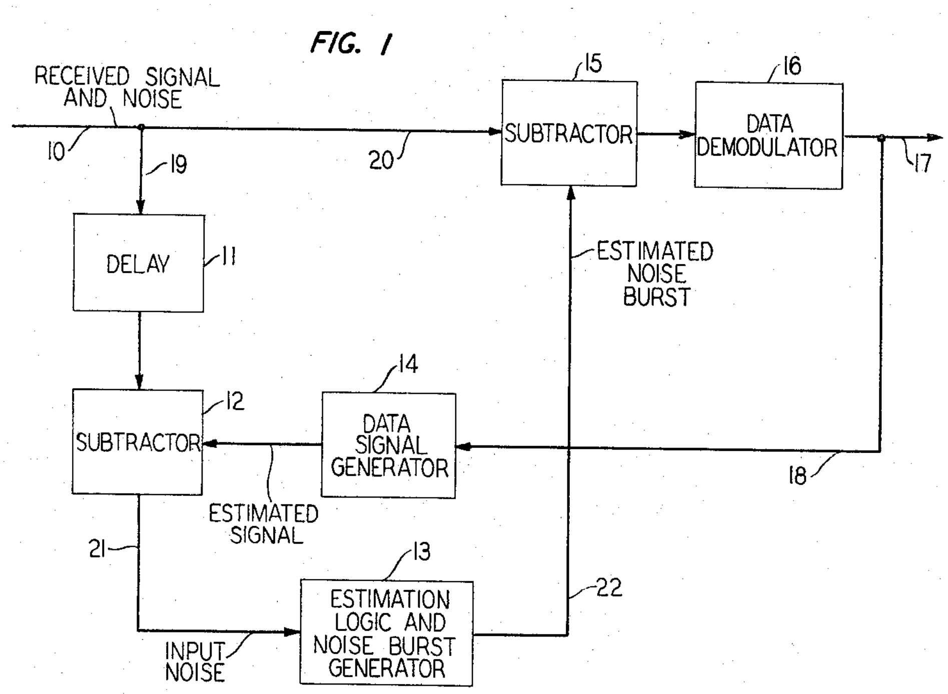
FIG. 1 is a block diagram of a data receiver modified according to this invention to recognize the beginning of an impulse noise burst, estimate from initial samples thereof its characterizing parameters, generate a full counterburst and subtract the counterburst from the received intelligence signal.

FIG. 1 illustrates in block diagram form the broad principle of this invention. Received signal energy with such noise as is added in passing through a transmission medium is incident on lead 10. In the absence of the noise reduction system of this invention the signal energy would be operated on by data demodulator 16, the receiver proper, to deliver a message data sequence to output line 17. Interposed between input line 10 and demodulator 16 is subtractor 15 connected over line 20 to the junction of lines 10 and 19. Subtractor 15 provides means for canceling the noise accompanying the received signal with the estimated noise burst generated in block 13. To obtain a noise signal on which generator 13 can base its operation data signal generator 14 under the keying control of demodulator 16 by way of line 18 produces a data sequence identical to that generated at the transmitter. This identical regeneration of the transmitted signal naturally requires that the transmitter carrier be reproduced at the receiver with correct frequency and phase. Such arrangements are well known and are therefore not shown in the drawing.

The output of signal generator 14 is a valid estimated signal provided impulse noise has not obliterated the received signal. Subtractor 12 takes the difference between the total received signal on line 19 as delayed in network 11 and the output of generator 14 to isolate the noise component on line 21. Delay network 11 is provided to compensate for the inherent delay in getting the received signal through demodulator 16 and signal generator 14.

When an impulse noise burst occurs on the transmission channel and begins to build up, it is sensed at the input of the estimation logic in block 13. At onset of the noise burst no data decision errors are occurring so that the output of data signal generator 14 is valid. The input to estimation block 13 comprises the beginning of the impulse noise burst and background Gaussian noise. The shape of the noise burst envelope, similar to the cyclical sin $x/x$ impulse response pattern of an ideal channel but deviating therefrom in a manner readily ascertainable by one skilled in the transmission art, is assumed known for a given practical channel bandwidth. Only the random peak amplitude and time of occurrence are in doubt. Similarly, the carrier frequency for the noise burst is known, except for random phase. Based on a sampling of the initial portion of the burst, these three unknown parameters can be estimated and the total noise burst generated. Once the simulated noise burst is generated and the receiver delay compensated, the estimated noise burst is in the proper time position. This simulated noise burst is then supplied to subtractor 15 over line 22 and subtracted from the received signal and noise. An essentially noise-free signal is thus made available to data demodulator 16.

FIG. 1 depicts the noise burst correction system of this invention for the predetection case. If the original modulation process results from either frequency or phase shift keying, the demodulation process is nonlinear, and the baseband noise bursts do not have identical shapes. Therefore, the noise burst subtraction must be performed prior to demodulation. However, if amplitude modulation is performed at the transmitter, then the estimation and subtraction can be done after demodulation in the receiver. The noise burst then being at baseband there is no carrier wave and the random phase parameter need not be estimated.

Figure 2:
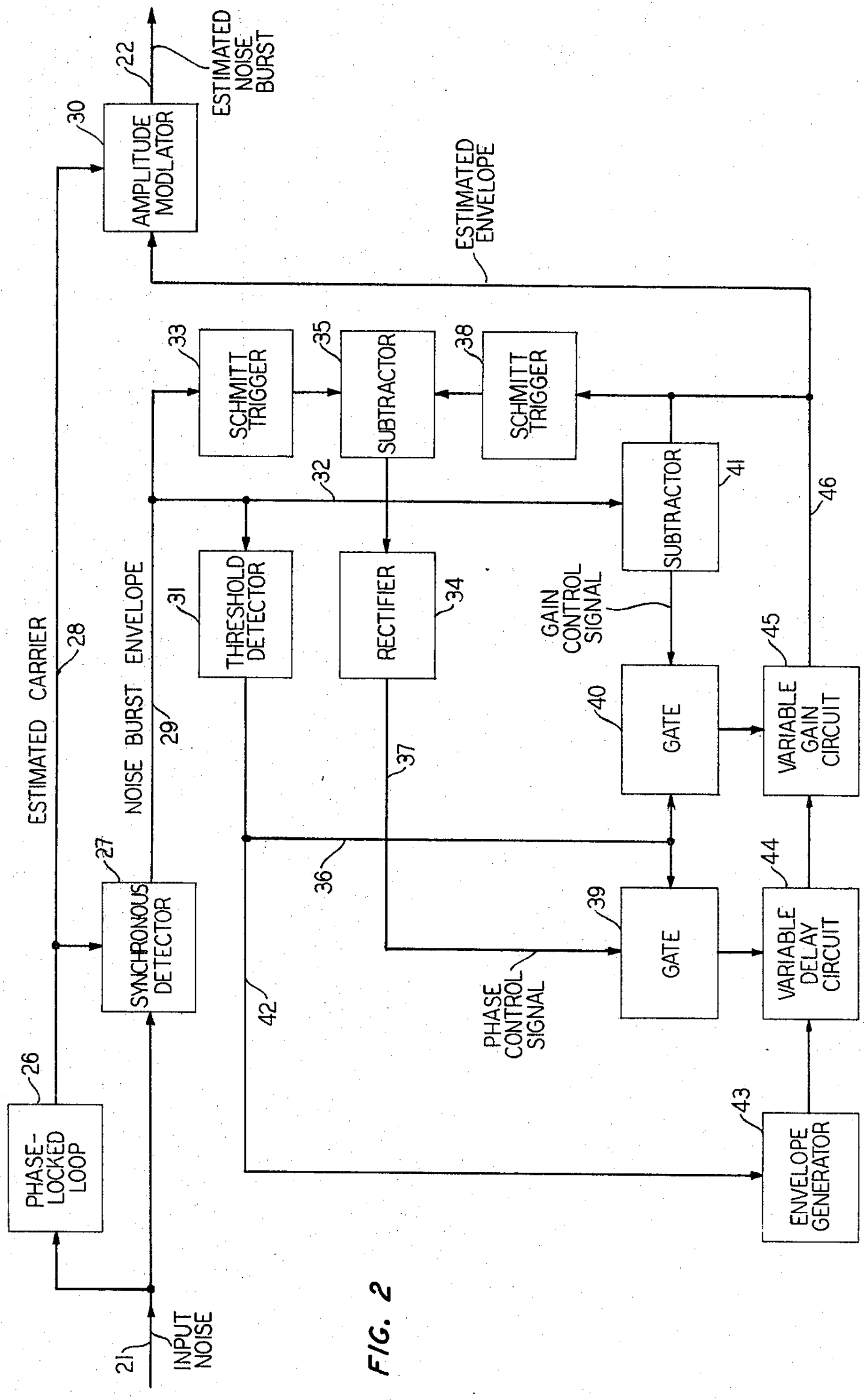
FIG. 2 is a block diagram of an illustrative embodiment of an extremely precise impulse noise estimator and generator according to this invention.

The parameter estimation and noise burst generator functions represented by block 13 of FIG. 1 can be implemented in several ways. FIG. 2 shows one such embodiment providing for precise estimation of noise carrier frequency and phase as well as noise amplitude.

The input noise as received from subtractor 12 in FIG. 1 is applied on lead 21 to phase-locked oscillator 26 and synchronous detector 27, each of conventional design. The estimated noise carrier frequency appears on lead 28 and also drives synchronous detector 27. The output of detector 27 is normal low-level Gaussian noise, but on the occurrence of a noise burst its enhanced envelope appears on lead 29. At the time the noise burst envelope exceeds the level of the Gaussian noise and before it is large enough to cause signal demodulation errors, it is recognized by threshold detector 31. The output of detector 31 triggers envelope generator 43 on lead 42 and opens gates 39 and 40 on lead 36. Envelope generator 43 is designed by conventional techniques to produce a representative impulse noise burst envelope, whose shape is known from previous study of transmission channels of a particular bandwidth.

The noise burst envelope from detector 27 is also applied to Schmitt trigger circuit 33. At the same time the output of envelope generator 43 is applied through variable delay circuit 44 and variable gain circuit 45 to Schmitt trigger circuit 38 on lead 46. Each Schmitt trigger circuit produces a square wave with zero crossings corresponding to those of its input. The resultant square waves from each Schmitt trigger circuit are compared in subtractor 35 and a difference signal comprising a sequence of narrow pulses at the zero crossings is obtained. These bipolar pulses are of variable width indicative of the timing error between the outputs of synchronous detector 27 and envelope generator 43. The pulses are rectified in rectifier 34 to form a control signal on lead 37 for variable delay circuit 44 through which passes the output of envelope generator 43 to drive the timing error to zero.

A further subtractor 41 is provided to determine the difference in amplitude between the true noise burst envelope from detector 27 and the estimated envelope from generator 43. The respective outputs from detector 27 on lead 32 and generator 43 on lead 46 are compared in subtractor 41 to produce a control signal through gate 40 for variable gain circuit 45 operating on the output of generator 43. The final estimated envelope on lead 46 is modulated onto the estimated carrier wave on lead 28 in modulator 30 in a conventional manner. The regenerated noise burst appears at the output of modulator 30 on lead 22.

When the noise burst envelope grows large enough to begin causing errors in signal demodulation, the estimated signal cannot be accepted with confidence because the input to the estimation logic may not be the true noise. At an envelope size somewhat lower than the error-causing level, threshold detector 31 closes gates 39 and 40, thereby blocking the timing and amplitude error control signals from variable delay circuit 44 and variable gain circuit 45. Before this point is reached, the delay and gain have been adjusted to match the true input noise. The envelope generator is left free-running to span the interval over which the impulse noise burst would normally be obliterating signal bits.

Figure 3:
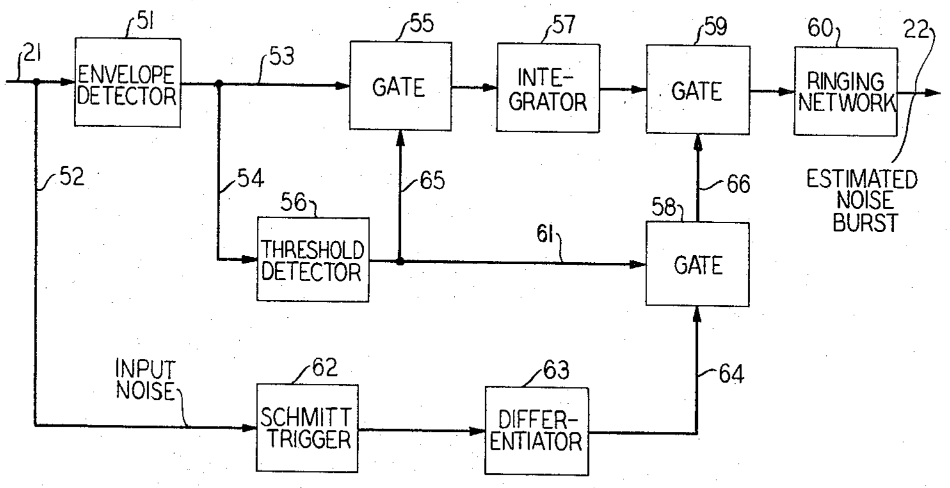
FIG. 3 is a block diagram of an illustrative embodiment of a simplified impulse noise generator according to this invention.

A simpler embodiment for the estimation logic and noise burst generator 13 of FIG. 1 can be realized in accordance with the circuit of FIG. 3. The embodiment of FIG. 3 substitutes an envelope detector for the synchronous detector of the embodiment of FIG. 2 and depends on a ringing network to generate the estimated noise burst.

The input noise appearing on lead 21 as a result of the subtraction of the estimated signal in subtractor 12 of FIG. 1 is applied to a conventional envelope detector 51 and to Schmitt trigger circuit 62. The output of envelope detector 51 drives threshold detector 56 on lead 54 and gate 55 on lead 53. When the envelope of a developing impulse noise burst is large enough to be distinguishable from Gaussian noise, it is recognized by threshold detector 56. On the next zero crossing of the envelope an output on lead 65 opens gate 55 and admits the envelope on lead 53 to integrator 57. The latter develops a voltage proportional to the peak amplitude of one-half cycle of the noise envelope. On the succeeding zero crossing of the noise envelope detector 56 changes state and gate 55 closes.

In the meantime input noise on lead 52 has been incident on Schmitt trigger 62 which yields a square wave output corresponding to the zero crossings of the noise burst carrier. Differentiator 63 following trigger 62 produces a train of pulses at the frequency of and in phase with, the noise burst carrier wave. These pulses on lead 64 are blocked by gate 58 under the control of threshold detector 56. They are blocked while the integrator 57 is reaching its full output value. When the threshold detector 56 closes gate 55, it opens gate 58. The next pulse appears on lead 66 and opens gate 59, thereby admitting the output of integrator 57 to ringing network 60. The pulse on lead 66 occurs at a zero crossing of the noise burst carrier wave and the integrator output determines the amplitude of the impulse triggering ringing network 60. The output on lead 22 is the estimated noise burst. Network 60 is designed to have a response equal to the remaining portion of a typical noise burst and continues to ring for several cycles after gate 55 is closed by threshold detector 56, and the integrator is discharged, thus bridging the interval during which the estimated signal would otherwise be unreliable.

The estimated noise burst resulting from the embodiment of FIG. 3 maintains a constant phase relation between envelope and carrier while the true noise bursts have a random phase relation. The phase of the estimated noise burst carrier is correct, since ringing network 60 is triggered at an instant corresponding to a noise carrier zero crossing. The timing of the envelope may be in error by as much as one-half cycle of carrier. This error does not occur in the embodiment of FIG. 2 because of the phase-locked oscillator loop. Since there are many carrier cycles per envelope cycle, the percentage error is generally negligible. A small timing error, at most, results in a substantial reduction in the impulse noise burst rather than a complete elimination. The error rate is substantially lowered by the embodiment of FIG. 3, although not to the degree achieved by the embodiment of FIG. 2. Nevertheless, the embodiment of FIG. 3 is satisfactory for many services and is considerably more economical of parts.

While the assumption made in this specification that noise burst envelopes are substantially identical for transmission channels of a given bandwidth is not precisely true in general, there are data transmission systems for which it is an extremely accurate approximation. Indeed, systems exist for which it is almost exactly true. Teletypewriter systems using a narrow-band transmission channel about one-sixteenth the bandwidth of a full voice channel are good examples. As the bandwidth of a transmission channel is made narrower, each noise burst at the output of the channel becomes very nearly the impulse response of the channel and less a function of the character of a wideband disturbance which causes it. With a very narrow-band channel, the series of noise bursts will have nearly identical envelopes, modulating the identical center frequency. To make optimum use of the impulse noise reduction properties of this invention, high speed data signals requiring wide transmission bands can be divided among a plurality of narrow-band channels by well known time-division sampling and distributing techniques. Then each signal bit can modulate a carrier on a narrow-band channel for a pulse width as many times the bit length as there are channels. The individual channels are then frequency-multiplexed together for transmission. The principles of this invention can be applied channel by channel to the received signal before demodulation.

It will be apparent to one skilled in the communications art that this invention is susceptible of many modifications without departing from the spirit and scope of the appended claims.

What is claimed is:

1. An arrangement for reducing the effects of impulse noise on data signals transmitted through a medium subject to such noise comprising a data demodulator, means responsive to said data demodulator for regenerating a replica of the waveshape for each transmitted signal element, means obtaining a difference signal between the received waveshape for each data signal element and said replica waveshape as a measure of the impulse noise added to the transmitted signal by traversal of said medium, means responsive to said difference exceeding a preassigned minimum level for generating a simulated counter noise burst having the phase and amplitude characteristics of representative impulse noise, and means substracting said counter noise burst from said received waveshape to produce a signal at the input of said demodulator substantially free of impulse noise.

2. The arrangement of claim 1 in which said counter noise-burst generating means comprises a phase-locked oscillator loop generating a carrier wave of the same phase and frequency as that of said difference signal, a synchronous detector controlled by said carrier wave deriving the envelope of said difference signal, envelope generator means having an output in the waveshape of the envelope of a representative impulse noise burst when triggered, a threshold circuit responsive to said synchronous detector triggering said envelope generator when its input exceeds a said preassigned minimum level, variable delay means in series with said envelope generator, variable gain means also in series with said envelope generator, means responsive to the difference in phase between the envelope of said difference signal and that from said envelope generator for adjusting said delay means to reduce said phase difference to substantially zero,
means responsive to the difference in amplitude between the envelope of said difference signal and that from said envelope generator for adjusting said gain means to reduce said amplitude difference to substantially zero, and
means for modulating the output of said envelope generator as operated on by said delay and gain means onto the carrier wave from said oscillator loop.

3. The arrangement of claim 1 in which said counter noise-burst generating means comprises
an envelope detector for said difference signal,
an integrator for the envelope from said envelope detector,
a threshold detector for the envelope from said envelope detector,
trigger circuit means responsive to the zero crossings in the noise burst carrier wave,
differentiating means in tandem with said trigger circuit means,
the combined output of said trigger circuit and differentiating means being a train of bipolar pulses,
a ringing network having a damping characteristic after triggering matching that of a representative impulse noise burst, and
gating means under the control of said threshold detector permitting the charging of said integrator from a single cycle of said envelope and further permitting the joint triggering of said ringing network by said integrator and said differentiating means to produce said counter noise burst.

4. The arrangement of claim 2 in which said delay-adjusting means comprises
a first Schmitt trigger circuit producing a square wave in synchronism with the zero crossings in the true noise burst envelope from said synchronous detector,
a second Schmitt trigger circuit producing another square wave in synchronism with the zero crossings in the envelope of the counter noise burst from said envelope generator means,
subtractor means combining the square waves from said first and second Schmitt trigger circuits into a pulse train representative of the timing error between said true and counter noise bursts, and
rectifier means operating on the pulse train from said subtractor means to obtain a bidirectional control signal for said variable delay means.

5. The arrangement of claim 2 in which
gating circuits are interposed between said variable delay means and its adjusting means and between said variable gain means and its adjusting means, and
each of said gating circuits is opened by said threshold detector upon the input thereto exceeding said preassigned minimum level.

6. The arrangement of claim 2 in which
said threshold circuit is further responsive to its input exceeding a preassigned maximum level corresponding to the impulse noise level at which said data demodulator makes faulty data interpretations and thereby reverts to its quiescent output state.

7. The arrangement of claim 6 in which
gating circuits couple said delay-adjusting and gain-adjusting means to said respective variable delay and gain means in series with said envelope generator and said gating circuits are opened responsive to said threshold circuit being in other than its quiescent output state.

8. In combination with a data transmission system subject to impulse noise, means for reducing the effect of such impulse noise on a received data signal comprising means for regenerating the transmitted data signal waveshape for each individual demodulated data bit,
means subtracting each regenerated data bit from the total received signal to obtain an estimate of the noise added by said transmission system,
means responsive to the noise from said subtracting means exceeding a predetermined minimum level for generating an estimated noise burst locked in phase and time of occurrence with the onset only of a true noise burst, and
means taking the difference between said estimated noise burst and the total received signal to obtain a received data signal substantially free of impulse noise.

9. The combination in accordance with claim 8 in which a delay unit preceding said subtracting means compensates for the inherent delay in said regenerating means with respect to said received data signal.

10. The combination in accordance with claim 8 in which said estimated noise burst generating means comprises
a synchronous detector for deriving the true noise burst envelope from said subtracting means,
an estimated noise burst envelope generator having an output having the waveshape of the envelope of representative impulse noise at a fixed peak amplitude,
adjustable delay means in tandem with said envelope generator,
adjustable amplifying means in series with said envelope generator,
means deriving a control signal for said delay means from the difference in timing between zero-crossing transitions in the true noise burst envelope from said synchronous detector and the estimated noise burst envelope from said envelope generator,
means deriving a control signal for said amplifying means from the difference in amplitude of the true and estimated noise burst envelopes,
means gating each of said control signals to the respective delay and amplifying means, and
a threshold detector changing its output state responsive to the true noise burst envelope falling between a minimum detectable level and a maximum level at which data signal impairment occurs,
said changed output state triggering said envelope generator and opening said gating means.

11. The combination in accordance with claim 8 in which said estimated noise burst generating means comprises
an envelope detector for the true noise burst from said subtracting means,
means generating a train of pulses corresponding to zero-crossings in the true noise burst carrier wave,
integrator means obtaining a measure of the amplitude of the true noise burst from the energy in the output of said envelope detector,
a ringing network provided with a damping characteristic representative of a true impulse noise burst,
a threshold detector responsive to the output of said envelope detector completing a single half cycle, and
gating means controlled by said threshold detector for coupling said pulse-train generating means and said integrator means simultaneously to said ringing network to generate an estimated impulse noise burst in correct phase and amplitude to cancel a true impulse noise burst.

References Cited

UNITED STATES PATENTS

| | | | |
|---|---|---|---|
| 3,322,968 | 5/1967 | Dennis | 328—165 X |
| 2,784,256 | 3/1957 | Cherry | 325—42 |

ROBERT L. GRIFFIN, *Primary Examiner.*

J. T. STRATMAN, *Assistant Examiner.*